United States Patent [19]

Kerth et al.

[11] Patent Number: 5,544,775
[45] Date of Patent: Aug. 13, 1996

[54] LASER MACHINED SLIDER

[75] Inventors: Randall T. Kerth; Douglas J. Krajnovich; Murlidhar V. Kulkarni, all of San Jose; Wing P. Leung, Arcadia; Andrew C. Tam, Saratoga, all of Calif.

[73] Assignee: International Business Machines Corporation, Armonk, N.Y.

[21] Appl. No.: 363,159

[22] Filed: Dec. 22, 1994

[51] Int. Cl.⁶ ....................................................... B23C 3/00
[52] U.S. Cl. .............................................. 216/65; 216/81
[58] Field of Search .................. 216/65, 81; 219/121.67, 219/121.68, 121.69, 121.7, 121.71, 121.72, 121.85; 264/25

[56] References Cited

U.S. PATENT DOCUMENTS

| | | | |
|---|---|---|---|
| 4,490,211 | 12/1984 | Chen et al. | 216/62 |
| 4,894,115 | 1/1990 | Eichelberger et al. | 216/65 X |
| 4,957,591 | 9/1990 | Sato et al. | 216/81 X |
| 5,129,991 | 7/1992 | Gilton | 216/66 |
| 5,334,280 | 8/1993 | Anthony et al. | 216/65 |

FOREIGN PATENT DOCUMENTS

| | | | |
|---|---|---|---|
| 62-140225 | 6/1987 | Japan | G11B 5/60 |
| 62-167883 | 7/1987 | Japan | 216/81 X |
| 64-76417 | 3/1989 | Japan | G11B 5/60 |

OTHER PUBLICATIONS

Ralchenko et al, "Laser Patterning of DLC (Diamond–like Carbon) films", Proc.-Electrochem. Soc. (1993), 93–17 (Proceedings of the Third International Symposium on Diamond Materials, 1993), 633-9 CODEN: PESODO; ISSN:0161-6374.

"Additional Technical Information About UDAC Substrate for Sputtered Magnetic Recording Media", Kobe Steel, Ltd., Kobe, Japan, Mar., 1990.

"Creation of An Air Bearing Surface by Excimer Laser Patterning of Ceramic", J. Brannon, W. Hing, D. Krajnovick and A. C. Tam, *IBM Technical Disclosure Bulletin,* vol. 34, No. 4B, Sep. 1991.

"Emission Spectra and Etching of Polymers and Graphite Irradiated by Excimer Lasers", G. Koren and J. T. C. Yeh, *J. Appl. Phys.,* 56(7), Oct. 1, 1984, pp. 2120–2126.

"Laser–Induced Fluorescence Study of Laser Sputtering of Graphite", R. W. Dreyfus, R. Kelly and R. E. Walkup, Nuclear Instruments and Methods in Physics Research B23 (1987) 557–561.

"Disk With Patterned Overcoat and Flat Magnetic Underlayer", D. C. Cheng, M. C. Chuang, A. C. Tam, A. Ting and A. Wu, *IBM Technical Disclosure Bulletin,* vol. 32, No. 5B, Oct., 1988, p. 264.

*Primary Examiner*—Thi Dang
*Attorney, Agent, or Firm*—Baker, Maxham, Jester & Meador

[57] ABSTRACT

A method is provided for making a high definition, high aspect ratio amorphous carbon element, such as a slider, which carries one or more magnetic heads in a disk drive. A special gaseous environment is provided during laser etching which results in virtually no redeposition of the etched material. The result is a carbon element which has good edge definition for establishing desirable flying characteristics of a slider. In a preferred embodiment the laser etching, which is preferably implemented by an excimer laser, is performed in an gaseous environment of oxygen saturated with water vapor at a pressure above ambient. Significant improvements were also realized with nitrogen saturated with water vapor at a pressure above ambient and steam at ambient pressure. High aspect ratios were achieved, namely slope angles of 50° to 60°.

23 Claims, 7 Drawing Sheets (Amount of Re-deposition at different etching conditions)

(Etch Rate of Amorphous Carbon at 248nm)

LASER MACHINED SLIDER

BACKGROUND OF THE INVENTION

1. Field of the Invention

The present invention relates to a laser machined slider and more particularly to a slider which is machined in a selected atmosphere, the selected atmosphere promoting high definition and high aspect ratio patterns during laser etching.

2. Background of the Invention

A slider is employed for supporting a write/read head with respect to a rotating disk in a disk drive so that the write/read head can record and play back signals on tracks on the disk. The slider is attached to a suspension arm which is, in turn, attached to an actuator for selectively positioning the slider over the tracks on the magnetic disk. When the disk is rotated the slider rides ("flies") on a cushion of air (an "air bearing") slightly off of the surface of the disk, the cushion of air being generated by the high-speed movement of the disk.

The slider is typically a block of hard material which has an air bearing surface (ABS) that faces the surface of the disk. One or more magnetic heads may be mounted on the slider, typically at its trailing edge. The ABS may be contoured to establish desired pressure gradients for positioning and stabilizing the slider above the surface of the disk. For instance, rails can be provided adjacent side edges of the slider to lower the height of the slider with respect to the surface of the disk. In some instances U-shaped rails are employed for creating a negative pressure gradient, which draws the slider even closer to the disk surface for a given suspension load.

In order for a slider to fly at low altitudes over the surface of a rotating disk the contour of the ABS must have high definition and a high aspect ratio. High definition means that the rails or other configurations at the ABS be substantially free of irregularities, such as unwanted protrusions, bumps, ridges or jagged edges.

Sliders are typically made of titanium carbide (TiC) aluminum oxide ($Al_2O_3$) ceramic which has good wear quality. TiC—$Al_2O_3$ may be machined by reactive ion etching (RIE) or ion milling. First, a layer of photoresist is formed on the ABS with a pattern of the desired shape. The ABS is then RIE'ed or ion milled to machine the desired configuration. The layer of photoresist is then removed. This process, which is normally done at the batch level, produces sliders which have high definition. However, this process does not produce high aspect ratios.

Another material which is being considered for sliders is amorphous carbon, also known as high density amorphous carbon (HDAC). Amorphous carbon wears extremely well and can be easily machined by laser etching. Since a laser beam can be patterned using a mask and suitable projection optics, there is no requirement for photoresist as required for RIE of TiC—$Al_2O_3$ sliders. Very high aspect ratios can be achieved. Unfortunately, as the laser beam machines the ABS it heaps debris on the surfaces of the ABS adjacent the machined site, resulting in poor definition. This is caused by redeposition of the etched material which increases in thickness with the depth of the etch. This debris is unacceptable since it perturbs the air flow and leads to unwanted head-disk interactions. In order to minimize this problem ultrasonic cleaning is employed to remove debris. Even with ultrasonic cleaning some of the debris remains.

SUMMARY OF THE INVENTION

The present invention provides a method of making a high definition, high aspect ratio amorphous carbon slider. A special gaseous environment is provided during laser etching which results in virtually no irregularities caused by debris from laser etching. We have discovered that redeposition during laser etching can be virtually eliminated by combining a gas with water vapor. A preferred embodiment employs $O_2$ saturated with water. Other embodiments include saturated $N_2$ or steam. During laser etching in the special gaseous environment it is believed that gaseous products, such as hydrogen and carbon dioxide, are formed which minimize redeposition. With this process low wear sliders, which have excellent flying characteristics, can be easily fabricated.

An object of the present invention is to provide a low wear carbon slider which has excellent flying characteristics in a disk drive.

Another object is to provide a method of making a pattern in a carbon element which has high definition and high aspect ratio.

A further object is to laser etch an amorphous carbon slider with a pattern which has high definition and high aspect ratio.

Still another object is to provide a special gaseous environment for laser etching carbon so that virtually no redeposition takes place.

Still a further object is to provide a method of laser etching carbon wherein the etch time, definition and aspect ratio are maximized and redeposition is minimized.

These and other objects of the invention will become more readily apparent from the ensuing specification when taken together with the drawings.

DESCRIPTION OF THE PREFERRED EMBODIMENTS

Figure 1:
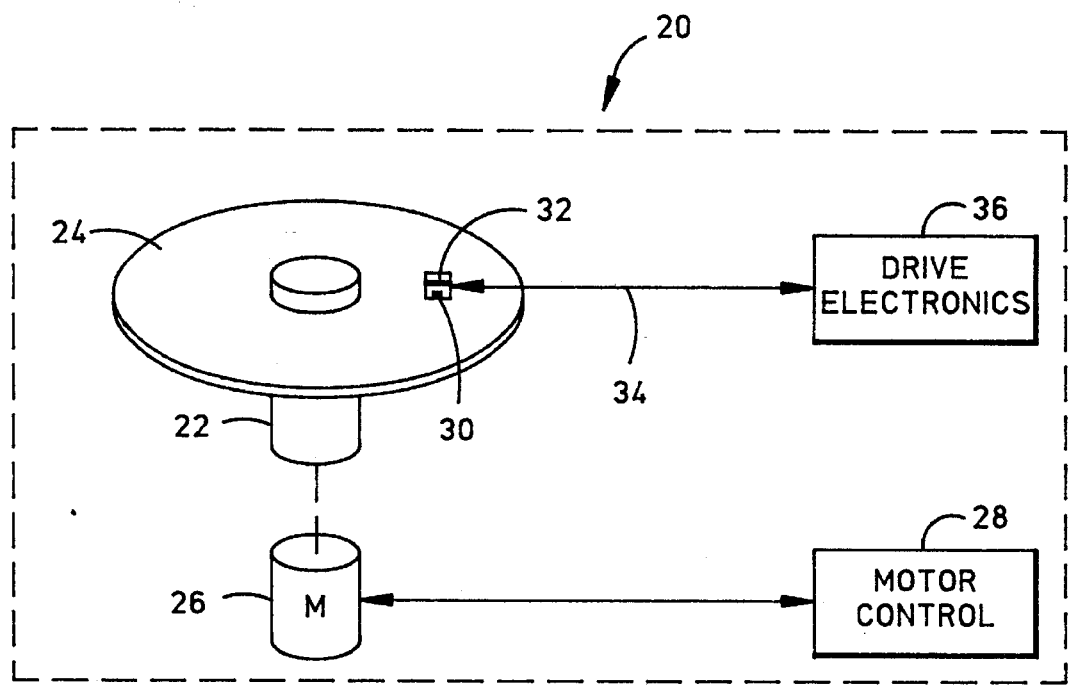
FIG. 1 is an isometric schematic illustration of a disk drive.

Referring now to the drawings wherein like reference numerals designate like or similar parts throughout the several views, there is illustrated in FIG. 1 a magnetic disk drive 20. The disk drive 20 includes a spindle 22 which supports and rotates a magnetic disk 24. The spindle 22 is rotated by a motor 26 which is controlled by motor control 28. A magnetic read/write transducer, referred to as a magnetic head 30, is mounted on a slider 32 which is, in turn, supported by a suspension and actuator arm 34. The method of making the slider 32 is the subject of the present invention. The suspension and actuator arm 34 positions the slider 32 so that the magnetic head 30 is in a transducing relationship with a surface of the magnetic disk 24. When the disk 24 is rotated by the motor 26 the slider flies on an air bearing having a thickness in the order of 0.075 μm. The magnetic head 30 is then employed for writing and reading data on multiple tracks on the surface of the disk 24. The data is conventionally processed for writing and reading by drive electronics 36.

Figure 2:
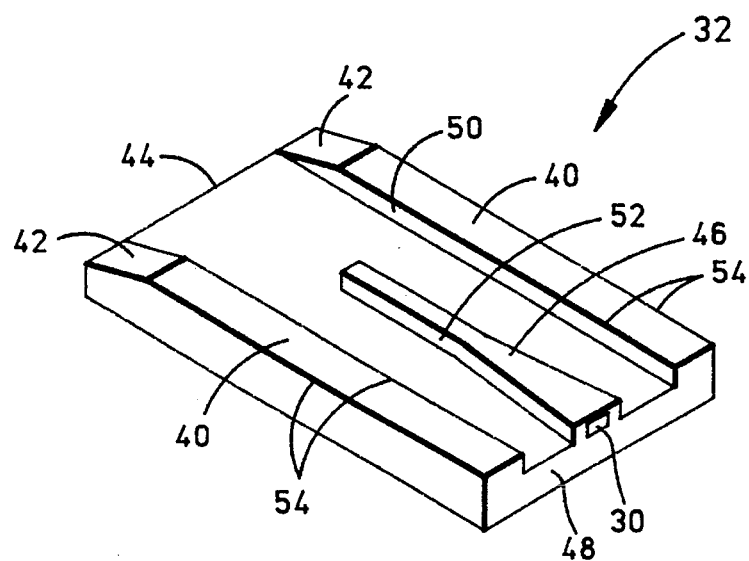
FIG. 2 is an isometric ABS view of a slider.

FIG. 2 illustrates an air bearing surface (ABS) view of the slider 32. This is the surface that faces a surface of the magnetic disk 24 shown in FIG. 1. The ABS is typically contoured for producing the desired flying height and desired stability of the slider as it rides on an air bearing. As illustrated in FIG. 2 a typical pattern for a slider includes a pair of side rails 40 which have taper-flats 42 at a forward end 44 of the slider. A center rail 46 extends from an offset position from the forward edge 44 to a trailing edge 48 of the slider. The magnetic head 30 is mounted on an end of the center rail 46 at the trailing edge of the slider. The rails 40 and 46 have sides, a side 50 being seen for one of the side rails 40 and a side 52 being seen for the center rail 46 in FIG. 2.

Sliders made of carbon have advantages over sliders made from titanium carbide (TIC). Carbon sliders are lighter and have less stiction problems. Also a carbon slider can be more readily patterned by a laser beam. Our preferred embodiment is an amorphous carbon slider which is patterned by an excimer laser. When amorphous carbon is patterned with an excimer laser, wall angles in the range of 50° to 60° with high edge definition can be achieved.

Figure 3:
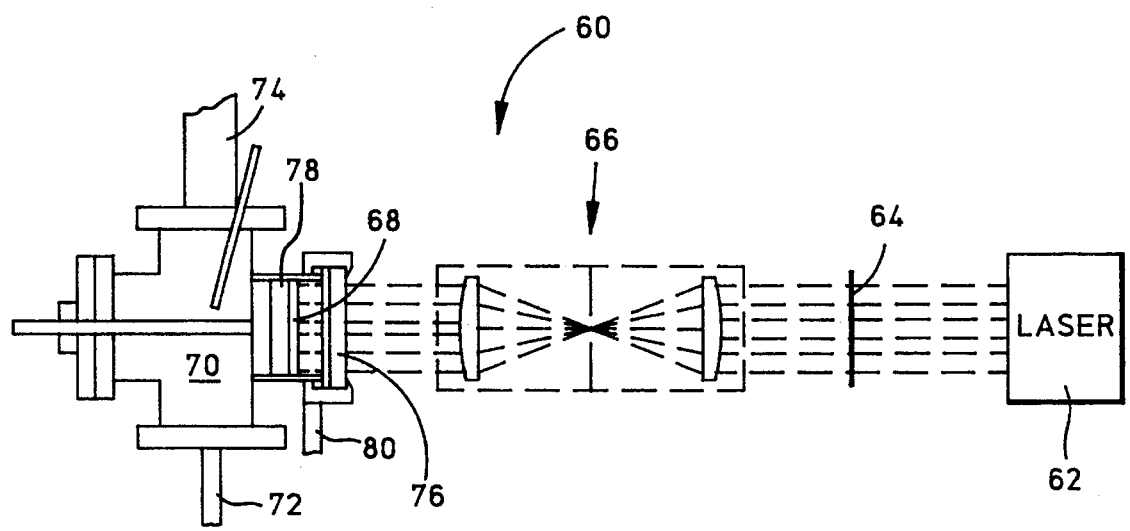
FIG. 3 is a schematic illustration of a chamber with a special gaseous environment for laser etching amorphous carbon.

FIG. 3 illustrates a laser etching apparatus 60 for patterning a slider. The apparatus includes a laser 62, a mask 64, an imaging system 66 and a carbon piece 68 which is mounted in a chamber 70. Tubes 72 and 74 are connected to pumps (not shown) for establishing the desired pressure within the chamber 70. A UV grade quartz window 76 permits laser light to enter the chamber and impinge on the carbon piece 68 which is held by a holder 78. A tube 80 permits the introduction of reactive gas into the chamber 70. A full description of this laser apparatus is described in U.S. Pat. No. 4,490,211 which is commonly assigned to IBM.

Figure 4:
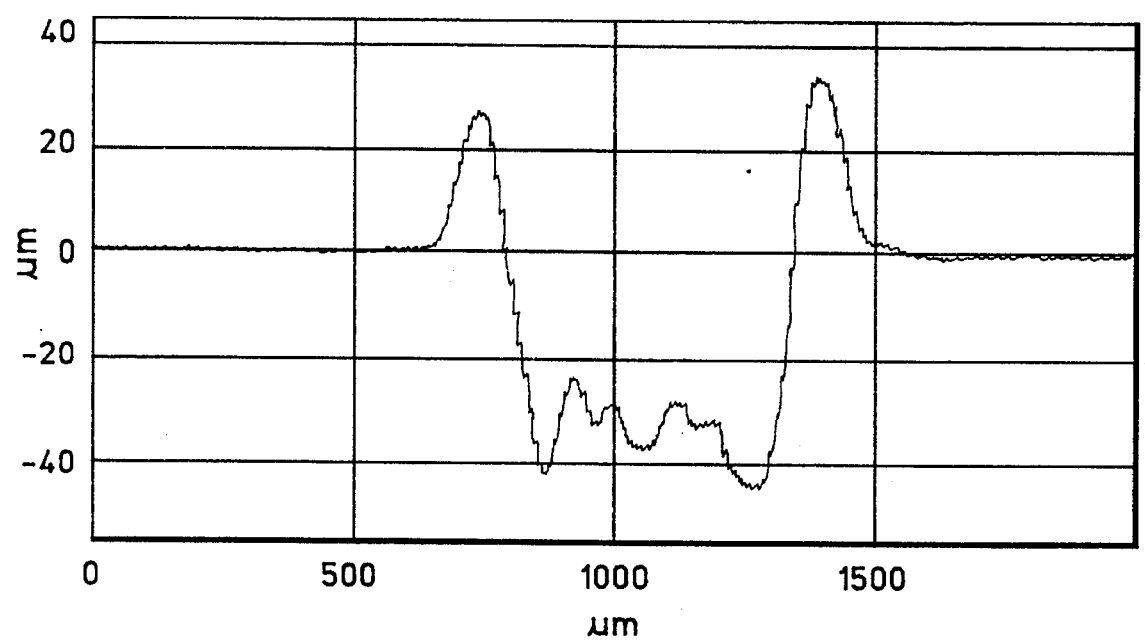
FIG. 4 is a graph showing the profile of a prior art laser etched spot on carbon in an air environment.
Figure 5:
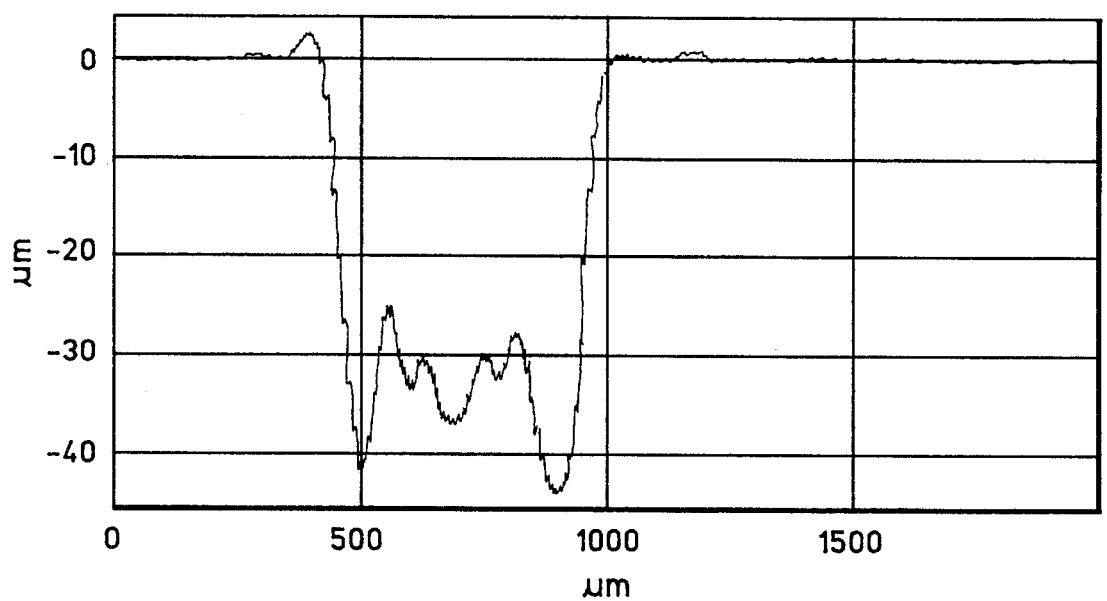
FIG. 5 is a graph showing the profile of the prior art laser etched spot of FIG. 4 after ultrasonic cleaning.
Figure 8:
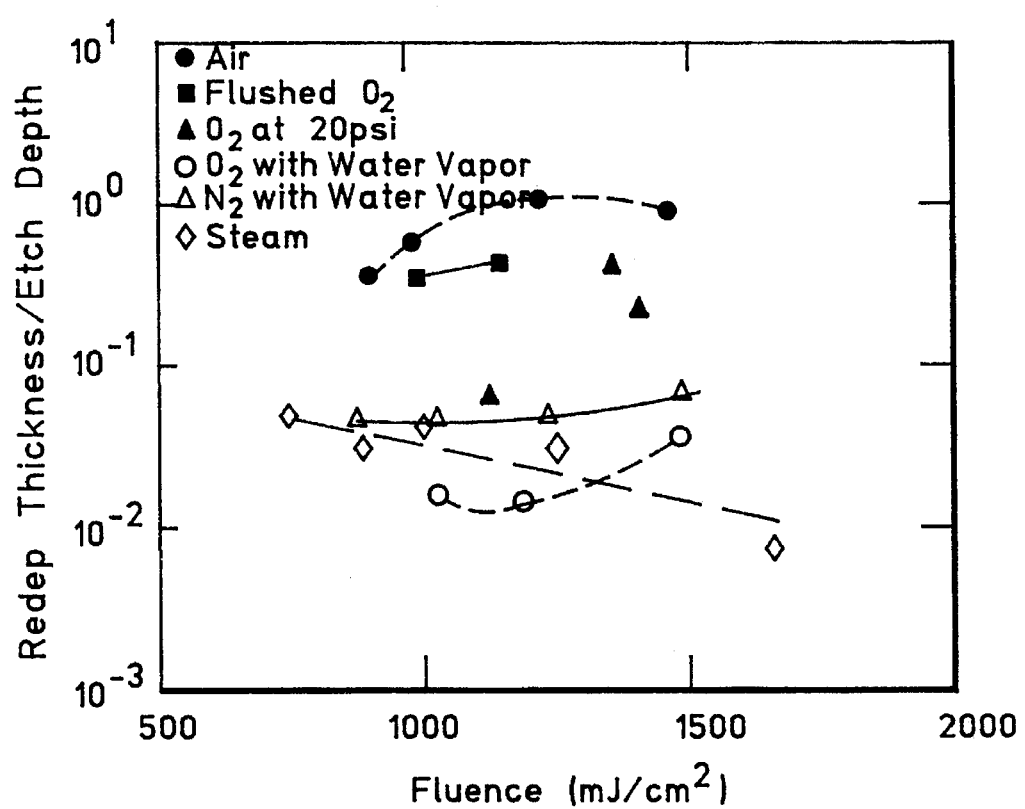
FIG. 8 is a chart showing redeposition thickness per etch depth versus fluence in various gaseous environments.

Various tests were conducted with the laser apparatus 60 illustrated in FIG. 3 to evaluate the results of laser etching a pattern into amorphous carbon to produce a slider. In one test, amorphous carbon in an air environment was spot etched by an excimer laser having a wavelength of substantially 248 nm, a pulse duration of 16 ns and a fluence of substantially 600 mj/cm$^2$. A profile of the spot was taken with an Alphastep 200 Stylus profilometer. The result is shown in FIG. 4. The depth of the spot is approximately 40 microns and a ridge around the spot, above a desired level of zero, is approximately 30 microns. The ridge is caused by redeposition of the amorphous carbon during etching. The same spot was then ultrasonically cleaned and the result is shown in FIG. 5. Even after ultrasonic cleaning a noticeable ridge remained around the spot. Tests conducted under the above conditions at different fluences are shown by the filled circles in FIG. 8.

Figure 6:
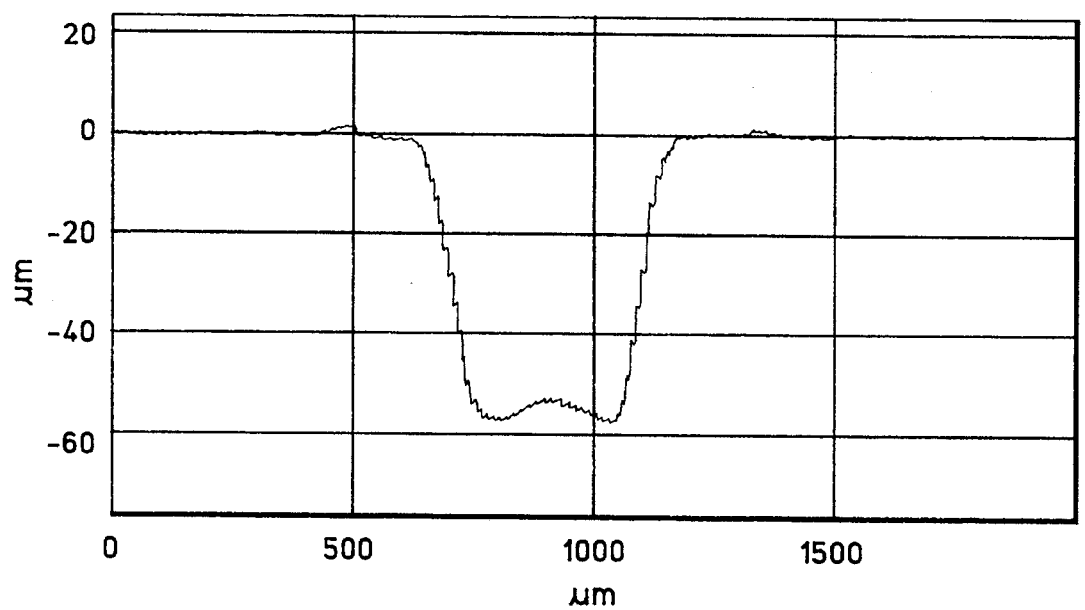
FIG. 6 is graph showing the profile of the present laser etched spot on carbon in a special gaseous environment of oxygen saturated with water vapor.

In another test, a carbon piece was placed in the chamber of FIG. 3 with the chamber filled with oxygen saturated with water vapor at 20 psi above ambient. Laser etching was conducted under the same circumstances as the first test, except the special atmosphere of oxygen saturated with water vapor was employed. The result was the spot shown in FIG. 6. It can be seen from FIG. 6 that the ridge around the spot is hardly noticeable. The step of ultrasonic cleaning was not necessary. The preferred embodiment of the present invention is to laser etch carbon in an atmosphere of oxygen saturated with water vapor at 20 psi above ambient. Tests conducted according to the preferred embodiment at different fluences are shown by the open circles in FIG. 8.

Figure 7:
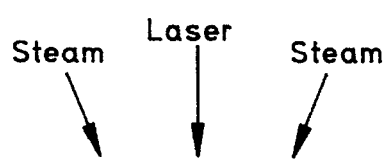
FIG. 7 is a schematic illustration of laser etching carbon in a steam environment.

Another test was conducted where the carbon piece was patterned with the excimer laser while the carbon piece was being flushed with oxygen at ambient pressure. The flushing can be in the chamber of FIG. 3 or outside a chamber. In this test, oxygen is merely flushed over the surface which is being etched. The results at various fluences are shown by the filled squares in FIG. 8. Still other tests were conducted in the chamber at various fluences with oxygen at 20 psi above ambient. The results of this testing are shown by the filled triangles in FIG. 8. A further test was conducted with nitrogen saturated with water vapor at 20 psi above ambient. The results of this testing are shown by the open triangles in FIG. 8. As shown in FIG. 7, a still further test was conducted by flushing the surface of the carbon piece with steam during etching. The results of this testing at various fluences are shown by the open diamonds in FIG.8.

Figure 9:
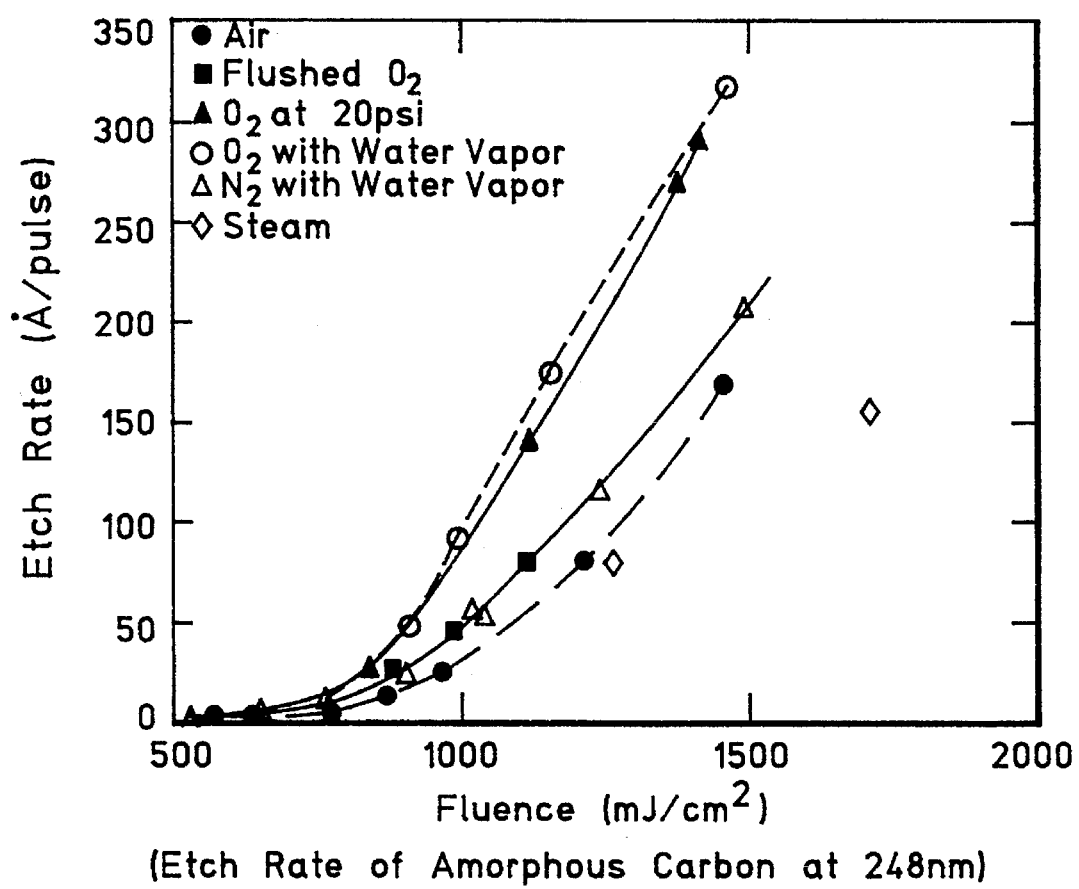
FIG. 9 is chart illustrating etch rate versus fluence of laser etching in various gaseous environments.

The etch rate per fluence for the various test conducted hereinabove are shown in FIG. 9. It can be seen that the best etch rate is oxygen saturated with water vapor at 20 psi. A slightly lower etch rate is oxygen at 20 psi without saturation. While laser etching with steam had a lesser etch rate than laser etching in air it produced very little redeposition.

Obviously, other embodiments and modifications of the invention will occur to those of ordinary skill in the art in view of the above teachings. Therefore, the invention is to be limited only by the following claims, which include all of such embodiments and modifications when viewed in conjunction with the above specifications and accompanying drawings.

We claim:

1. A method of machining a high definition, high aspect ratio pattern into an amorphous carbon element comprising the steps of:

etching the carbon element with a laser beam; and while etching, subjecting the carbon element to a gas substantially saturated with water vapor.

2. A method as claimed in claim 1 wherein:

while etching, subjecting the carbon element to a pressure above ambient.

3. A method as claimed in claim 2 wherein:

said pressure above ambient is substantially 20 psi.

4. A method as claimed in claim 1 wherein the step of etching comprises:

etching the carbon element with a laser beam from an excimer laser.

5. A method as claimed in claim 4 wherein:

the excimer laser is a KrF excimer laser with a wavelength of substantially 248 nm, a pulse duration of 16 ns and a fluence substantially in the range of 600–1,500 mj/cm$^2$.

6. A method as claimed in claim 1 wherein:

the carbon element is a slider.

7. A method as claimed in claim 1 wherein:

the gas is $O_2$.

8. A method as claimed in claim 7 wherein:

while etching, subjecting the carbon element to a pressure above ambient.

9. A method as claimed in claim 8 wherein:

said pressure above ambient is substantially 20 psi.

10. A method as claimed in claim 7 wherein the step of etching comprises:

etching the carbon element with a laser beam from an excimer laser.

11. A method as claimed in claim 10 wherein:

the excimer laser is a KrF excimer laser with a wavelength of substantially 248 nm, a pulse duration of 16 ns and a fluence substantially in the range of 600–1,500 mj/cm$^2$.

12. A method as claimed in claim 7 wherein:

the carbon element is a slider.

13. A method as claimed in claim 1 wherein:

the gas is $N_2$.

14. A method as claimed in claim 13 wherein:

while etching, subjecting the carbon element to a pressure above ambient.

15. A method as claimed in claim 14 wherein:

said pressure above ambient is substantially 20 psi.

16. A method as claimed in claim 13 wherein the step of etching comprises:

etching the carbon element with a laser beam from an excimer laser.

17. A method as claimed in claim 16 wherein:

the excimer laser is a KrF excimer laser with a wavelength of substantially 248 nm, a pulse duration of 16 ns and a fluence substantially in the range of 600–1,500 mj/cm$^2$.

18. A method as claimed in claim 13 wherein:

the carbon element is a slider.

19. A method as claimed in claim 1 wherein:

said gas substantially saturated with water is steam.

20. A method as claimed in claim 19 including the step of:

etching the carbon element in an atmosphere of one.

21. A method as claimed in claim 19 wherein the step of etching comprises:

etching the carbon element with a laser beam from an excimer laser.

22. A method as claimed in claim 21 wherein:

the excimer laser is a KrF excimer laser with a wavelength of substantially 248 nm, a pulse duration of 16 ns and a fluence substantially in the range of 600–1,500 mj/cm$^2$.

23. A method as claimed in claim 19 wherein:

the carbon element is a slider.

\* \* \* \* \*